(12) United States Patent
Hara et al.

(10) Patent No.: US 9,893,442 B2
(45) Date of Patent: Feb. 13, 2018

(54) ACTUATOR

(71) Applicant: SUMITOMO CHEMICAL COMPANY, LIMITED, Tokyo (JP)

(72) Inventors: Tomoyuki Hara, Tsukuba (JP); Yasuyuki Fujita, Tsukuba (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 15/603,558

(22) Filed: May 24, 2017

(65) Prior Publication Data

US 2017/0346204 A1    Nov. 30, 2017

(30) Foreign Application Priority Data

May 27, 2016  (JP) ................................. 2016-106446

(51) Int. Cl.
| | | |
|---|---|---|
| *H01R 12/70* | (2011.01) | |
| *C08K 7/14* | (2006.01) | |
| *C09K 19/32* | (2006.01) | |
| *H01R 13/502* | (2006.01) | |

(52) U.S. Cl.
CPC ........... *H01R 12/7058* (2013.01); *C08K 7/14* (2013.01); *C09K 19/322* (2013.01); *H01R 13/502* (2013.01)

(58) Field of Classification Search
CPC .................................................. H01R 12/7058
See application file for complete search history.

(56) References Cited

U.S. PATENT DOCUMENTS

| | | | | |
|---|---|---|---|---|
| 4,457,962 | A * | 7/1984 | Jaffe | B29C 45/0001 264/177.16 |
| 5,277,611 | A * | 1/1994 | Berek | H01R 12/7005 439/325 |
| 9,774,119 | B2 * | 9/2017 | Yamane | H01R 12/7058 |
| 2011/0034659 | A1* | 2/2011 | Kashio | C08G 77/06 528/33 |
| 2011/0124812 | A1* | 5/2011 | Tamada | C08G 77/18 524/861 |
| 2011/0232826 | A1* | 9/2011 | Hara | B29C 65/08 156/73.1 |
| 2013/0334477 | A1 | 12/2013 | Taketani et al. | |
| 2015/0024622 | A1* | 1/2015 | Jin | H01R 12/7029 439/355 |
| 2017/0141500 | A1* | 5/2017 | Yamane | H01R 12/79 |

FOREIGN PATENT DOCUMENTS

| | | |
|---|---|---|
| JP | 11-224746 A | 8/1999 |
| WO | 2012/102235 A1 | 8/2012 |

\* cited by examiner

*Primary Examiner* — James Harvey
(74) *Attorney, Agent, or Firm* — Sughrue Mion, PLLC (57) ABSTRACT

The present invention relates to an actuator that has a specific structure, and is molded from a resin composition, in which the resin composition contains a liquid crystal polyester having a specific repeating unit and a filling material, an amount of the repeating unit including a 2,6-naphthylene group is 40 mol % or more with respect to a total number of moles of all repeating units configuring the liquid crystal polyester, and an amount of the filling material is less than 55 parts by mass with respect to 100 parts by mass of the total amount of the liquid crystal polyester and the filling material.

5 Claims, 3 Drawing Sheets

ACTUATOR

BACKGROUND OF THE INVENTION

Field of the Invention

The present invention relates to an actuator that is used in a surface-mounted electric connector including a contact which is in contact with a conductor formed in a sheet-shaped cable such as a flexible printed circuit board (which may be abbreviated to FPC) and a flexible flat cable (which may be abbreviated to FFC), and a housing which accommodates the contact.

Priority is claimed on Japanese Patent Application No. 2016-106446, filed on May 27, 2016, the content of which is incorporated herein by reference.

Description of Related Art

In the related art, a surface-mounted electric connector has been used in internal wiring of a mobile phone or a smart phone, a notebook personal computer or a tablet terminal, a portable music terminal, or the like.

In recent years, in accordance with miniaturization and weight reduction of a mobile device, it is demanded to make thickness thinner and a pitch between terminals narrower, particularly in a connector for the mobile device. In accordance with making of a thin wall of a product itself of the mobile device, thin wall strength and thin wall flowability are demanded in a resin material.

On the other hand, from the viewpoint of heat resistance, flame retardance, and material rigidity, in the related art, polyphenylene sulfide (which may be abbreviated to PPS) or high heat resistant nylon has been used for an actuator used in the surface-mounted electric connector.

For example, it is described that polybutylene terephthalate (which may be abbreviated to PBT), polyamide (which may be abbreviated to PA), polyphenylene sulfide (which may be abbreviated to PPS), liquid crystal polymer (which may be abbreviated to LCP), or the like can be used as a material of an FPC presser plate in Japanese Unexamined Patent Application, First Publication No. H11-224746. In consideration of heat resistance, moldability, and dimensional stability, it is disclosed that LCP is suitable among the above materials.

In the use of electric and electronic fields, a demand for achieving halogen-free with respect to the material is heightened, in addition to heat resistance and flame retardance hitherto. In a printed circuit board, in accordance with JPCA-ES01/JAPAN, IEC61249-2-21, IPC4101B/U.S., the definition of "halogen-free" is defined such that an amount of chlorine (Cl): 0.09 wt % (900 ppm) or less, a content percentage of bromine (Br): 0.09 wt % (900 ppm) or less, and the total amount of the content percentages of chlorine (Cl) and bromine (Br): 0.15 wt % (1500 ppm) or less.

SUMMARY OF THE INVENTION

In the related art, PPS has been widely used for the actuator since PPS is a material having high strength, high hardness, and the fixed flowability.

However, in the manufacturing of the product in which the thin wall is made, a PPS resin is not sufficient in flowability, and there is a problem that molding of the product is difficult, or burrs are generated during molding.

In the PPS resin, since chlorine generally is generated in a polymerization process, there is a problem that halogen-free is less likely to be achieved.

For example, as described in PCT International Publication No. WO2012/102235, since high heat resistant nylon has high material strength, and is excellent in flowability in comparison with PPS, there is a case where high heat resistant nylon is used for the actuator.

However, since nylon has water absorbency, there is a problem that a swelling (blister) is generated at the time of the surface mounting.

Furthermore, since it is difficult to have flame retardance with high heat resistant nylon alone, there is a need of being filled with a flame retardant. In particular, in order to achieve the demanded high flame retardance, a method for using together and adding a halogen-based flame retardant represented by brominated polystyrene or the like, and an antimony-based flame retardant promoter represented by antimony trioxide or the like is considered to be used in the actuator. However, there is a problem that it is not possible to achieve the halogen-free in this method.

In a high heat resistant nylon resin which needs a processing temperature of 300° C. or higher, there is no flame retardant which can be resistant to the processing temperature. Furthermore, a metal salt of dialkyl phosphinic acid, which is only referred to as a high heat resistant flame retardant, has a problem of corroding metallic portions such as a cylinder and a screw of an extruding machine or an injection molding machine.

In liquid crystal polyester, the flowability of the resin is high, and the liquid crystal polyester alone is excellent in flame retardance, and the halogen-free can be achieved, but there are problems that the strength and the hardness of the material are weaker than those of nylon, and the practicability is not supported.

The present invention is made in view of the above circumstances, and an object thereof is to provide an actuator that is molded from a specific resin composition of which flowability is high, has high flame retardance, can achieve halogen-free, is excellent in strength and surface hardness even in a case of thin wall, is excellent in solder resistance since a blister is less likely to be generated, and is used in a surface-mounted electric connector.

[1] In an aspect of the present invention, there is provided an actuator which is rotatably attached to a housing, and presses and fixes a sheet-shaped cable to the housing, in a surface-mounted electric connector, the actuator including a plurality of through holes that penetrate in a thickness direction, in which the plurality of through holes are arranged in a line along a predetermined arrangement axis, the actuator is molded from a resin composition, the resin composition contains a liquid crystal polyester having a repeating unit represented by General Formula (1), a repeating unit represented by General Formula (2), and a repeating unit represented by General Formula (3), and a filling material, an amount of the repeating unit including a 2,6-naphthylene group in the liquid crystal polyester is 40 mol % or more with respect to a total number of moles of all repeating units configuring the liquid crystal polyester, and an amount of the filling material is less than 60 parts by mass with respect to 100 parts by mass of a total amount of the liquid crystal polyester and the filling material.

—O—Ar¹—CO— (1)

—CO—Ar²—CO— (2)

—X—Ar³—Y— (3)

[In General Formula (1) to General Formula (3), $Ar^1$ represents one of the group consisting of a phenylene group, a naphthylene group, and a biphenylylene group. $Ar^2$ and $Ar^3$ each independently represent one of the group consisting of a phenylene group, a naphthylene group, a biphenylylene group, and a group represented by General Formula (4). X and Y each independently represent one of the group consisting of an oxygen atom and an imino group. One or more hydrogen atoms in $Ar^1$, $Ar^2$ and $Ar^3$ may be each independently substituted with one of the group consisting of a halogen atom, an alkyl group having 1 to 10 carbon atoms, and an aryl group having 6 to 20 carbon atoms.]

$$—Ar^4\text{-}Z\text{-}Ar^5— \quad (4)$$

[In General Formula (4), $Ar^4$ and $Ar^5$ each independently represent one of the group consisting of a phenylene group and a naphthylene group. Z represents one of the group consisting of an oxygen atom, a sulfur atom, a carbonyl group, a sulfonyl group, and an alkylidene group having 1 to 10 carbon atoms.]

[2] In an aspect of the present invention, there is provided an actuator which is rotatably attached to a housing, and presses and fixes a sheet-shaped cable to the housing, in a surface-mounted electric connector, the actuator including a plurality of through holes that penetrate in a thickness direction, in which the plurality of through holes are arranged in a line along a predetermined arrangement axis, the actuator is molded from a resin composition, the resin composition contains a liquid crystal polyester having a repeating unit represented by General Formula (1), a repeating unit represented by General Formula (2), and a repeating unit represented by General Formula (3), and a filling material, an amount of the repeating unit including a 2,6-naphthylene group in the liquid crystal polyester is 40 mol % or more with respect to a total number of moles of all repeating units configuring the liquid crystal polyester, and an amount of the filling material is less than 55 parts by mass with respect to 100 parts by mass of a total amount of the liquid crystal polyester and the filling material.

$$—O—Ar^1—CO— \quad (1)$$

$$—CO—Ar^2—CO— \quad (2)$$

$$—X—Ar^3—Y— \quad (3)$$

[In General Formula (1) to General Formula (3), $Ar^1$ represents one of the group consisting of a phenylene group, a naphthylene group, and a biphenylylene group. $Ar^2$ and $Ar^3$ each independently represent one of the group consisting of a phenylene group, a naphthylene group, a biphenylylene group, and a group represented by General Formula (4). X and Y each independently represent one of the group consisting of an oxygen atom and an imino group. One or more hydrogen atoms in $Ar^1$, $Ar^2$ and $Ar^3$ may be each independently substituted with one of the group consisting of a halogen atom, an alkyl group having 1 to 10 carbon atoms, and an aryl group having 6 to 20 carbon atoms.]

$$—Ar^4\text{-}Z\text{-}Ar^5— \quad (4)$$

[In General Formula (4), $Ar^4$ and $Ar^5$ each independently represent one of the group consisting of a phenylene group and a naphthylene group. Z represents one of the group consisting of an oxygen atom, a sulfur atom, a carbonyl group, a sulfonyl group, and an alkylidene group having 1 to 10 carbon atoms.]

[3] In still another aspect of the present invention, in the actuator according to [1] or [2], the filling material is a glass fiber.

[4] In still another aspect of the present invention, in the actuator according to [3], an amount of the glass fiber is 30 parts by mass or more and 50 parts by mass or less with respect to 100 parts by mass of the total amount of the liquid crystal polyester and the glass fiber.

[5] In still another aspect of the present invention, in the actuator according to [3] or [4], a weight average fiber length of the glass fiber is 75 μm or more and 350 μm or less.

[6] In still another aspect of the present invention, in the actuator according to any one of [1] to [5], the liquid crystal polyester has 30 mol % or more and 80 mol % or less of the repeating unit represented by General Formula (1), 10 mol % or more and 35 mol % or less of the repeating unit represented by General Formula (2), and 10 mol % or more and 35 mol % or less of the repeating unit represented by General Formula (3), with respect to the total number of moles of all repeating units configuring the liquid crystal polyester.

According to the present invention, it is possible to provide an actuator that is molded from a specific resin composition of which flowability is high, has high flame retardance, can achieve halogen-free, is excellent in strength and surface hardness even in a case of thin wall, is excellent in solder resistance since a blister is less likely to be generated, and is used in a surface-mounted electric connector.

DETAILED DESCRIPTION OF THE INVENTION

<Actuator>

An actuator of an embodiment is rotatably attached to a housing, and presses and fixes a sheet-shaped cable to the housing, in a surface-mounted electric connector.

Hereinafter, the actuator will be described in detail by preferable embodiments of the present invention with reference to the drawings.

In another aspect of the present invention, there is provided an actuator including a main body portion of a resin that includes a plurality of through holes, and an attaching portion that is attached to a housing, in which the resin is molded from a resin composition, and the resin composition contains a liquid crystal polyester having a repeating unit represented by General Formula (1), a repeating unit represented by General Formula (2), and a repeating unit represented by General Formula (3), and a filling material, an amount of the repeating unit including a 2,6-naphthylene group in the liquid crystal polyester is 40 mol % or more with respect to a total number of moles of all repeating units configuring the liquid crystal polyester, and an amount of the filling material is less than 55 parts by mass with respect to 100 parts by mass of the total amount of the liquid crystal polyester and the filling material.

In still another aspect of the present invention, there is provided a surface-mounted electric connector including the actuator and the housing, in which the housing includes a main body portion that includes a inserting portion for inserting a sheet-shaped cable, a plurality of contacts that is a conductor portion which is in contact with a conductor included in the sheet-shaped cable, and a sidewall portion having a non-through hole into which the attaching portion of the actuator is inserted.

Figure 1A:
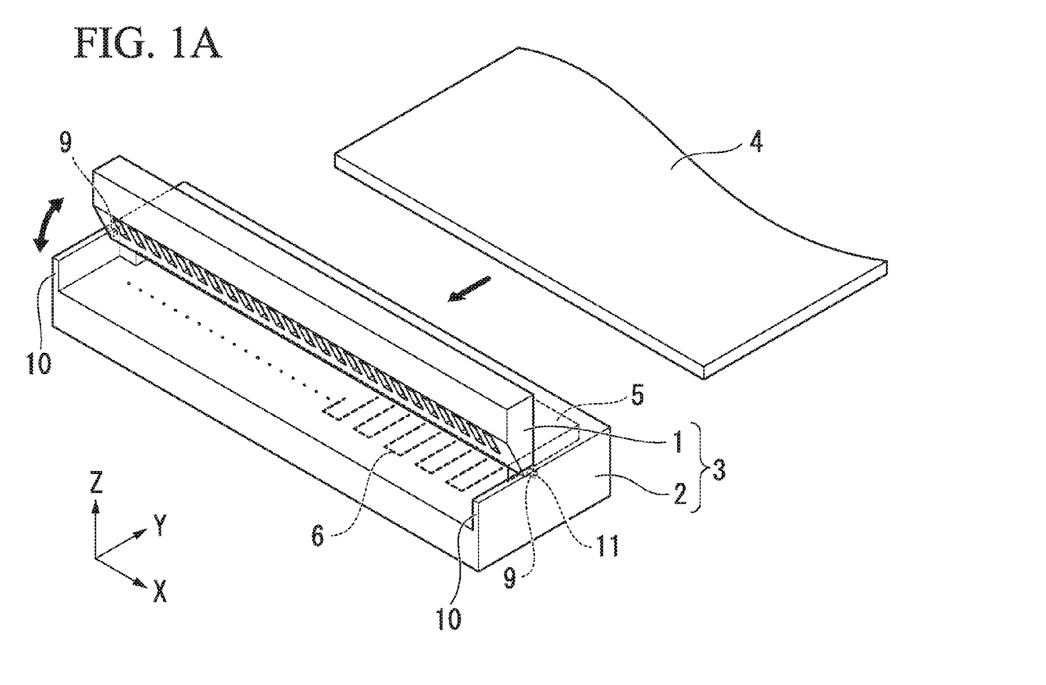
FIG. 1A is a schematic diagram showing an example of a surface-mounted electric connector including an actuator of the present invention.
Figure 1B:
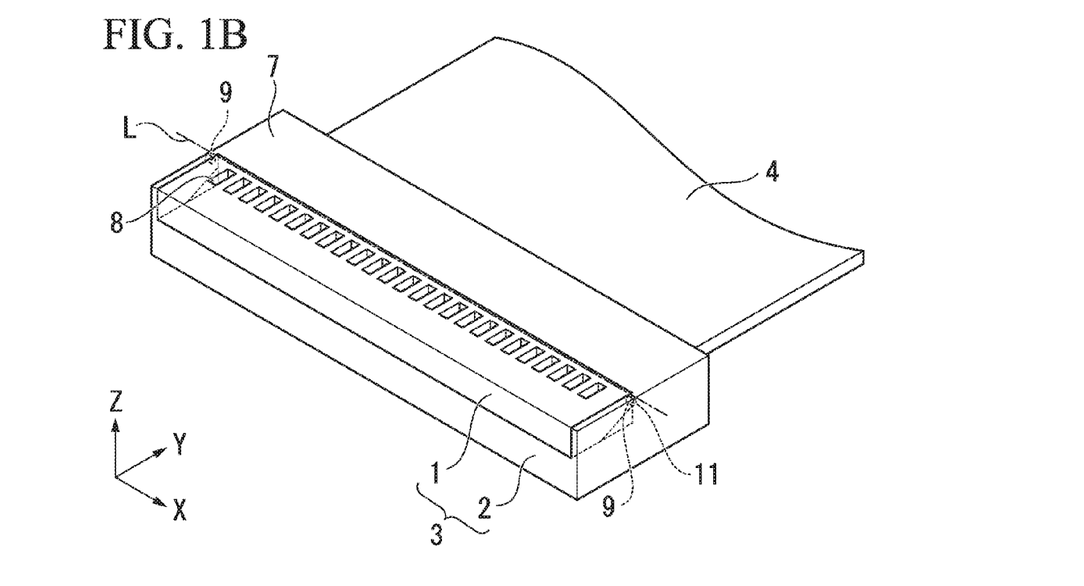
FIG. 1B is a schematic diagram showing an example of the surface-mounted electric connector including the actuator of the present invention.

FIG. 1A and FIG. 1B are schematic perspective diagrams of a surface-mounted electric connector 3 including a main body of an actuator 1 of the embodiment. FIG. 1A is a diagram showing an opened state of the main body of the actuator 1, and FIG. 1B is a diagram showing a closed state of the main body of the actuator 1.

As shown in FIG. 1A and FIG. 1B, the surface-mounted electric connector (which may be referred to as an "FPC connector" hereinafter) 3 includes the main body of the actuator 1 and a main body of a housing 2. The surface-mounted electric connector 3 causes a wiring which is connected to the surface-mounted electric connector 3 in advance and is not shown in the drawing, and a sheet-shaped cable (which may be referred to as an "FPC cable" hereinafter) 4 to be electrically conductive, and is used in order to retain the sheet-shaped cable 4.

The main body of the actuator 1 has an outer shape of an approximately rectangular parallelepiped which is oblong in a planar view. A plurality of through holes 8 penetrating in a z direction (which may be referred to as a thickness direction, hereinafter) as shown in FIG. 1B are formed in the main body of the actuator 1, and the plurality of through holes 8 are arranged in a line in an x direction (which may be referred to as a long side direction, hereinafter).

In another aspect of the present invention, the number of the plurality of through holes 8 may be set according to a size of the FPC cable, is preferably 5 to 200, and is more preferably 5 to 150.

As shown in FIGS. 1A, 1B, 2A, and 2B, the main body of the actuator 1 includes cylindrical attaching portions 9 at both ends in the long side direction.

The main body of the housing 2 has an outer shape of an approximately rectangular parallelepiped which is oblong in a planar view. The width of the main body of the housing 2 in a y direction (which may be referred to as a short side direction, hereinafter) is set to be wider than a width of the main body of the actuator 1 in the short side direction. On an upper surface of the main body of the housing 2, a convex portion of the housing 7 of an approximately rectangular parallelepiped shape that has a width shorter than the width of the main body of the housing 2 in the short side direction, and extends in the long side direction is disposed. In the convex portion of the housing 7, an inserting portion 5 penetrating into the convex portion of the housing 7 in the short side direction thereof is disposed. Hereinafter, a side on which the convex portion is disposed in the y direction is referred to as a rear end portion (also referred to as a rear end direction), and a side on which the convex portion is not disposed is referred to as a front end portion (also referred to as a front end direction).

A sidewall portion of the housing 10 has an outer shape of an approximately rectangular parallelepiped which is oblong in a planar view, and is disposed on both the long side direction ends of the upper surface of the main body of the housing 2 where the convex portion of the housing 7 is not disposed. A non-through hole 11 is formed on a surface of an inner side in the long side direction of the sidewall portion of the housing 10 (a surface in contact with the surfaces at both ends of the main body of the actuator 1 in long side direction).

As shown in FIG. 1B, the main body of the actuator 1 is disposed along the convex portion of the housing 7. The length of the main body of the actuator 1 in the long side direction is shorter than the length of the main body of the housing 2 and the convex portion of the housing 7 in the long side direction by the width of the sidewalls of the housing 10 in the x direction. The main body of the actuator 1 is supported to be rotatable in a two-way arrow direction shown in FIG. 1A around a rotating shaft L set in the long side direction of the convex portion of the housing 7 by inserting the attaching portion 9 of the actuator into the non-through hole 11 of the sidewall portion in the housing.

In the front end portion of the main body of the housing 2, a plurality of contacts 6 that are in contact with a conductor disposed on a bottom surface of the sheet-shaped cable 4, and are electrically connected are disposed.

As shown in FIG. 1B, a structure in which when the sheet-shaped cable 4 is inserted into the inserting portion 5 from the rear end portion of the main body of the housing 2 and the actuator is closed, the sheet-shaped cable is retained in the connector, the main body of the actuator 1 presses the sheet-shaped cable 4 downward, and the conductor disposed on the bottom surface of the sheet-shaped cable is in contact with the contact 6 accommodated in the housing is made.

Figure 2A:
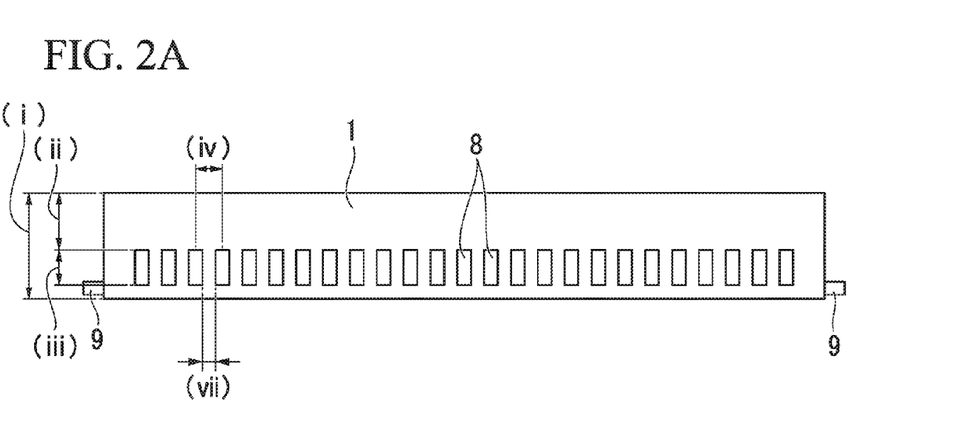
FIG. 2A is a schematic top view of the actuator of the present invention.

FIG. 2A is a top view of the actuator. In FIG. 2A, an upper portion is the front end direction, and a lower portion is the rear end direction.

The length of the actuator in the long side direction is generally 5 mm to 60 mm.

The length of the actuator in the short side direction is generally 1.5 mm to 5 mm.

In the actuator of the embodiment, in FIG. 2A, a width (i) of the short side direction of the actuator is approximately 1 mm, a width (ii) which is from an upper end to the shortest through hole is approximately 0.5 mm, and a width (iii) of the short side direction of the through hole is approximately 0.3 mm.

In another aspect of the present invention, the width (i) is 0.7 to 1.3 mm, the width (ii) is 0.3 to 0.7 mm, and the width (iii) is 0.1 to 0.5 mm.

Figure 2B:
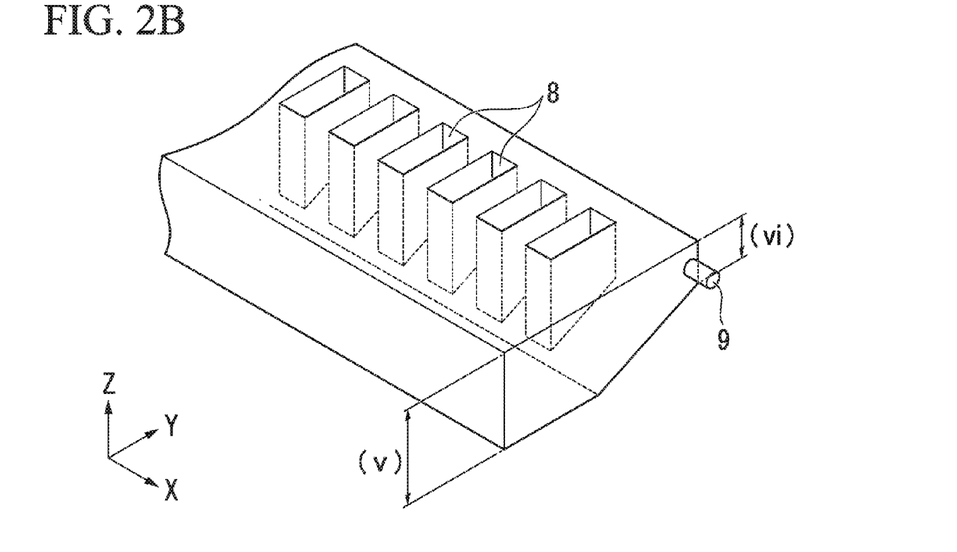
FIG. 2B is a schematic perspective diagram of the actuator of the present invention.

FIG. 2B is a perspective view of a portion of the actuator. The actuator of the embodiment is formed of a thick wall portion and a thin wall portion. The width of the thickness direction of the forefront end portion of the actuator shown in FIG. 2B, that is, the thickness of a thick wall portion (v) is approximately 0.5 mm, and the width of the thickness direction of the rearmost end portion, that is, the thickness of a thin wall portion (vi) is approximately 0.3 mm.

In another aspect of the present invention, the thickness of the thick wall portion (v) is 0.3 to 0.7 mm, and the thickness of the thin wall portion (vi) is 0.1 to 0.5 mm.

The thickness of a thin wall portion (vii) between the through holes which are adjacent to each other in a horizontal direction, that is, the long side direction shown in FIG. 2A can be appropriately adjusted by a pitch width which is formed between the through holes. For example, in a case where the pitch width (iv) between the through holes represented by a distance between a center of an optional through hole of the long side direction and a center of a through hole which is adjacent to the through hole shown in FIG. 2A is 0.2 mm, the thickness of the thin wall portion (vii) shown in FIG. 2A may be approximately 0.07 to 0.08 mm, and in a case where the pitch width (iv) between the through holes 8 shown in FIG. 2A is 0.25 mm, the thickness of the thin wall portion (vii) shown in FIG. 2A may be approximately 0.12 to 0.13 mm. In a case where which is a pitch width (iv) between the through holes 8 shown in FIG. 2A is 0.3 mm, the thickness of the thin wall portion (vii) shown in FIG. 2A may be approximately 0.17 to 0.18 mm.

In the actuator of the embodiment, a lattice is formed with the pitch width (iv) between the through holes 8 indicated by of FIG. 2A of approximately 0.1 to 0.8 mm. The pitch width between the through holes 8 of the formed lattice and the number of the formed lattices can be appropriately changed.

As described later, the actuator of the embodiment is molded by using a specific resin composition. By using the specific resin composition of which flowability of a resin is high, it is possible to obtain the actuator of which the pitch width is fine. For example, in the actuator of the embodiment, it is possible to adjust the pitch width (iv) indicated by FIG. 2A to be approximately 0.1 to 0.5 mm, to be approximately 0.1 to 0.3 mm, and to be approximately 0.1 to 0.2 mm.

Since the actuator of the embodiment is molded by using the specific resin composition, even in a case where the actuator is molded to have the fine pitch width as described above, the actuator can have sufficient strength and sufficient surface hardness.

Furthermore, since the actuator of the embodiment is molded by using the specific resin composition, it is possible to make the actuator which has high flame retardance, can achieve halogen-free, and is excellent in solder resistance since a blister is less likely to be generated.

<<Resin Composition>>

A resin composition used in order to form the actuator of the embodiment will be described.

In the embodiment, the resin composition contains a liquid crystal polyester having the repeating unit represented by General Formula (1), the repeating unit represented by General Formula (2), and the repeating unit represented by General Formula (3), and a filling material.

In detail, the amount of the repeating unit including a 2,6-naphthylene group in the liquid crystal polyester is 40 mol % or more with respect to the total number of moles of all repeating units configuring the liquid crystal polyester, and the amount of the filling material is less than 60 parts by mass with respect to 100 parts by mass of the total amount of the liquid crystal polyester and the filling material.

Here, the total number of moles indicates a value in which an amount (mol) which is equivalent to a substance amount of each repeating unit in the liquid crystal polyester is obtained by respectively dividing the total mass of the repeating units in the liquid crystal polyester by a formula weight of each corresponding repeating unit, and the amounts thereof are added to each other.

Since the actuator of the embodiment is molded by using the resin composition containing the above specific liquid crystal polyester, it is possible to produce the actuator which has high flame retardance, can achieve halogen-free, and is excellent in solder resistance since the blister is less likely to be generated. Moreover, since the liquid crystal polyester is excellent in flowability, it is possible to form the actuator having a lattice shape of the narrow pitch width.

(Liquid Crystal Polyester)

The liquid crystal polyester of the embodiment has the repeating unit represented by General Formula (1), the repeating unit represented by General Formula (2), and the repeating unit represented by General Formula (3).

$$—O—Ar^1—CO— \quad (1)$$

$$—CO—Ar^2—CO— \quad (2)$$

$$—X—Ar^3—Y— \quad (3)$$

[In General Formula (1) to General Formula (3), $Ar^1$ represents one of the group consisting of a phenylene group, a naphthylene group, and a biphenylylene group. $Ar^2$ and $Ar^3$ each independently represent one of the group consisting of a phenylene group, a naphthylene group, a biphenylylene group, and a group represented by General Formula (4). X and Y each independently represent one of the group consisting of an oxygen atom and an imino group. One or more hydrogen atoms in $Ar^1$, $Ar^2$ and $Ar^3$ may be each independently substituted with one of the group consisting of a halogen atom, an alkyl group having 1 to 10 carbon atoms, and an aryl group having 6 to 20 carbon atoms.]

$$—Ar^4-Z-Ar^5— \quad (4)$$

[In General Formula (4), $Ar^4$ and $Ar^5$ each independently represent one of the group consisting of a phenylene group and a naphthylene group. Z represents one of the group consisting of an oxygen atom, a sulfur atom, a carbonyl group, a sulfonyl group, and an alkylidene group having 1 to 10 carbon atoms.]

In General Formula (1) to General Formula (3), a fluorine atom, a chlorine atom, a bromine atom, and an iodine atom may be used, as a halogen atom which can be substituted for one or more hydrogen atoms in the group represented by $Ar^1$, $Ar^2$, or $Ar^3$.

In General Formula (1) to General Formula (3), a methyl group, an ethyl group, an n-propyl group, an isopropyl group, an n-butyl group, an isobutyl group, a sec-butyl group, a tert-butyl group, an n-hexyl group, an n-heptyl group, a 2-ethylhexyl group, an n-octyl group, an n-nonyl group, an n-decyl group, and the like may be used, as an example of the alkyl group having 1 to 10 carbon atoms which can be substituted for one or more hydrogen atoms in the group represented by $Ar^1$, $Ar^2$, or $Ar^3$.

In General Formula (1) to General Formula (3), a monocyclic aromatic group such as a phenyl group, a o-tolyl group, an m-tolyl group, or a p-tolyl group, and a condensed aromatic group such as a 1-naphthyl group and a 2-naphthyl group may be used, as an example of the aryl group having 6 to 20 carbon atoms which can be substituted for one or more hydrogen atoms in the group represented by $Ar^1$, $Ar^2$, or $Ar^3$.

In General Formula (1) to General Formula (3), in a case where one or more hydrogen atoms in the group represented by $Ar^1$, $Ar^2$, or $Ar^3$ are each independently substituted with the above group, the number of substitution is preferably 1 or 2, and is more preferably 1, per group represented by $Ar^1$, $Ar^2$, or $Ar^3$.

In General Formula (4), a methylene group, an ethylidene group, an isopropylidene group, an n-butylidene group and a 2-ethylhexylidene group, and the like may be used, as an example of the alkylidene group having 1 to 10 carbon atoms.

As a repeating unit represented by General Formula (1), a repeating unit in which $Ar^1$ is a 1,4-phenylene group (that is, repeating unit derived from p-hydroxybenzoic acid), and a repeating unit in which $Ar^1$ is a 2,6-naphthylene group (that is, repeating unit derived from 6-hydroxy-2-naphthoic acid) are preferably used. The repeating unit in which $Ar^1$ is a 2,6-naphthylene group is more preferably used.

In the specification herein, the term "derived" means that a compound such as p-hydroxybenzoic acid or 6-hydroxy-2-naphthoic acid undergoes a change in the chemical structure by polymerization.

As a monomer forming the repeating unit represented by General Formula (1), 2-hydroxy-6-naphthoic acid, p-hydroxybenzoic acid, or 4-(4-hydroxyphenyl)benzoic acid may be used. A monomer in which a hydrogen atom of a benzene ring or a naphthalene ring is substituted with the halogen atom, the alkyl group having 1 to 10 carbon atoms, or the aryl group having 6 to 20 carbon atoms may be used. Furthermore, the monomer may be used as an ester-forming derivative described later.

As a repeating unit represented by General Formula (2), a repeating unit in which $Ar^2$ is a 1,4-phenylene group (that is, repeating unit derived from terephthalic acid), a repeating unit in which $Ar^2$ is a 1,3-phenylene group (that is, repeating unit derived from isophthalic acid), a repeating unit in which $Ar^2$ is a 2,6-naphthylene group (that is, repeating unit derived from 2,6-naphthalene dicarboxylic acid), and a repeating unit in which $Ar^2$ is a diphenyl ether-4,4'-diyl group (that is, repeating unit derived from diphenyl ether-4,4'-dicarboxylic acid) are preferably used. The repeating unit in which $Ar^2$ is a 1,4-phenylene group and the repeating unit in which $Ar^2$ is a 2,6-naphthylene group are more preferably used.

As a monomer forming the repeating unit represented by General Formula (2), 2,6-naphthalene dicarboxylic acid, terephthalic acid, isophthalic acid or biphenyl-4,4'-dicarboxylic acid may be used. A monomer in which the hydrogen atom of the benzene ring or the naphthalene ring is substituted with the halogen atom, the alkyl group having 1 to 10 carbon atoms, or the aryl group having 6 to 20 carbon atoms may be used. Furthermore, the monomer may be used as an ester-forming derivative described later.

As a repeating unit represented by General Formula (3), a repeating unit in which $Ar^3$ is a 1,4-phenylene group (that is, repeating unit derived from hydroquinone, p-aminophenol or p-phenylene diamine), and a repeating unit in which $Ar^3$ is a 4,4'-biphenylylene group (that is, repeating unit derived from 4,4'-dihydroxybiphenyl, 4-amino-4'-hydroxybiphenyl or 4,4'-diaminobiphenyl) are preferably used.

As a monomer forming the repeating unit represented by General Formula (3), 2,6-dihydroxynaphthalene, hydroquinone, resorcin, or 4,4'-dihydroxybiphenyl may be used. A monomer in which the hydrogen atom of the benzene ring or the naphthalene ring is substituted with the halogen atom, the alkyl group having 1 to 10 carbon atoms, or the aryl group having 6 to 20 carbon atoms may be used. Furthermore, the monomer may be used as an ester-forming derivative described later.

In the monomer forming a repeating unit represented by General Formula (1) to General Formula (3), it is preferable that an ester-forming derivative is used in order to facilitate polymerization in the process of producing the polyester. The ester-forming derivative is referred to as a monomer having a group which promotes an ester forming reaction. Specific exemplary examples thereof include a highly reactive derivative such as an ester-forming derivative in which a carboxylic acid group in a monomer molecule is converted into an acid halide or an acid anhydride, or an ester-forming derivative in which a hydroxyl group in the monomer molecule is converted into a lower carboxylic acid ester group.

With respect to 100 mol % of the total number of moles of a repeating unit (1), a repeating unit (2), and a repeating unit (3), the amount of the repeating unit (1) in the liquid crystal polyester is preferably 30 mol % or more, and is more preferably 30 mol % or more and 80 mol % or less. The amount of the repeating unit (1) in the liquid crystal polyester is further preferably 40 mol % or more and 70 mol % or less, and is particularly preferably 45 mol % or more and 65 mol % or less.

With respect to 100 mol % of the total number of moles of all repeating units, the amount of the repeating unit (1) in the liquid crystal polyester is preferably 30 mol % or more, and is more preferably 30 mol % or more and 80 mol % or less. The amount of the repeating unit (1) in the liquid crystal polyester is further preferably 40 mol % or more and 70 mol % or less, and is particularly preferably 45 mol % or more and 65 mol % or less.

With respect to 100 mol % of the total number of moles of the repeating unit (1), the repeating unit (2), and the repeating unit (3), the amount of the repeating unit (2) in the liquid crystal polyester is preferably 35 mol % or less, and is more preferably 10 mol % or more and 35 mol % or less. The amount of the repeating unit (2) in the liquid crystal polyester is further preferably 15 mol % or more and 30 mol % or less, and is particularly preferably 17.5 mol % or more and 27.5 mol % or less.

With respect to 100 mol % of the total number of moles of all repeating units, the amount of the repeating unit (2) in the liquid crystal polyester is preferably 35 mol % or less, and is more preferably 10 mol % or more and 35 mol % or less. The amount of the repeating unit (2) in the liquid crystal polyester is further preferably 15 mol % or more and 30 mol % or less, and is particularly preferably 17.5 mol % or more and 27.5 mol % or less.

With respect to 100 mol % of the total number of moles of the repeating unit (1), the repeating unit (2), and the repeating unit (3), the amount of the repeating unit (3) in the liquid crystal polyester is preferably 35 mol % or less, and is more preferably 10 mol % or more and 35 mol % or less. The amount of the repeating unit (3) in the liquid crystal polyester is further preferably 15 mol % or more and 30 mol % or less, and is particularly preferably 17.5 mol % or more and 27.5 mol % or less.

With respect to 100 mol % of the total number of moles of all repeating units, the amount of the repeating unit (3) in the liquid crystal polyester is preferably 35 mol % or less, and is more preferably 10 mol % or more and 35 mol % or less. The amount of the repeating unit (3) in the liquid crystal polyester is further preferably 15 mol % or more and 30 mol % or less, and is particularly preferably 17.5 mol % or more and 27.5 mol % or less.

That is, in the liquid crystal polyester, it is preferable that the amount of the repeating unit (1) is 30 mol % or more and 80 mol % or less, the amount of the repeating unit (2) is 10 mol % or more and 35 mol % or less, and the amount of the repeating unit (3) is 10 mol % or more and 35 mol % or less, with respect to the total number of moles of the repeating unit (1), the repeating unit (2), and the repeating unit (3) is 100 mol %.

In the liquid crystal polyester, it is preferable that the amount of the repeating unit (1) is 30 mol % or more and 80 mol % or less, the amount of the repeating unit (2) is 10 mol % or more and 35 mol % or less, and the amount of the repeating unit (3) is 10 mol % or more and 35 mol % or less, with respect to the total number of moles of all repeating units is 100 mol %.

In the liquid crystal polyester, when the amount of the repeating unit (1) is in the above range, melt flowability, heat resistance, and strength and rigidity are likely to be improved.

In the liquid crystal polyester, a ratio of the amount of the repeating unit (2) to the amount of the repeating unit (3) is represented by [the amount of the repeating unit (2)]/[amount of the repeating unit (3)] (mol/mol). The ratio is preferably 0.9/1 to 1/0.9, is more preferably 0.95/1 to 1/0.95, and is further preferably 0.98/1 to 1/0.98.

The liquid crystal polyester has the repeating units including 2,6-naphthylene groups respectively, as a repeating unit (1), a repeating unit (2), and a repeating unit (3).

In the liquid crystal polyester, the amount of the repeating unit including a 2,6-naphthylene group is 40 mol % or more, is preferably 50 mol % or more, is more preferably 60 mol % or more, and is further preferably 70 mol % or more, with respect to 100 mol % of the total number of moles of all repeating units. When the amount of the repeating unit including a 2,6-naphthylene group is 40 mol % or more, the obtained resin composition has more favorable flowability at the time of melting process, becomes favorable in strength and surface hardness, and becomes more suitable in the processing of the actuator having a fine lattice structure.

In another aspect of the present invention, in the liquid crystal polyester, the amount of the repeating unit including a 2,6-naphthylene group is 40 to 85 mol %, is preferably 50 to 85 mol %, is more preferably 60 to 80 mol %, and is further preferably 70 to 75 mol %, with respect to 100 mol % of the total number of moles of all repeating units.

The liquid crystal polyester may have only one of the repeating units (1) to (3), or may have two or more of the repeating units (1) to (3), each independently. The liquid crystal polyester may have one of other repeating units or two or more of other repeating units, in addition to the repeating units (1) to (3). In a case where the liquid crystal polyester has other repeating units in addition to the repeating units (1) to (3), the amount of other repeating units is preferably 0.1 mol % or more and 10 mol % or less, and is more preferably 0.1 mol % or more and 5 mol % or less, with respect to the total number of moles of all repeating units.

It is preferable that the liquid crystal polyester has the repeating unit (3) in which X and Y respectively are oxygen atoms, that is, the liquid crystal polyester has a repeating unit derived from a predetermined aromatic diol since melting viscosity easily becomes low. It is more preferable that the liquid crystal polyester has only the repeating unit (3) in which X and Y respectively are oxygen atoms.

It is preferable that the liquid crystal polyester is produced by melt polymerizing a raw material monomer corresponding to the repeating unit configuring the liquid crystal polyester, and solid-phase polymerizing the obtained polymer (prepolymer). Thereby, it is possible to produce the liquid crystal polyester of high molecular weight which has high heat resistance, and strength and rigidity, with good operability. The melt polymerizing may be performed under the presence of a catalyst. Examples of the catalyst include metal compounds such as magnesium acetate, stannous acetate, tetrabutyl titanate, lead acetate, sodium acetate, potassium acetate, and antimony trioxide, and nitrogen-containing heterocyclic compounds such as N,N-dimethylaminopyridine and N-methylimidazole, and the nitrogen-containing heterocyclic compound is preferable among the above compounds.

The flow starting temperature of the liquid crystal polyester is preferably 270° C. or higher, is more preferably 270° C. or higher to 400° C. or lower, and is further preferably 280° C. or higher to 380° C. or lower. When the flow starting temperature of the liquid crystal polyester is in the above range, heat resistance, and strength and rigidity are likely to be improved, and thermal deterioration at the time of melt molding is less likely to be caused. Furthermore, the viscosity at the time of the melting does not become too high, and the flowability is less likely to be lowered.

The flow starting temperature is also referred to as a flow temperature or a fluid temperature, and is a temperature at which the viscosity is 4800 Pa·s (48000 poises) at the time of melting the liquid crystal polyester, and pressing out the liquid crystal polyester from a nozzle of an inner diameter of 1 mm and a length of 10 mm while increasing the temperature at a speed of 4° C./minute under load of 9.8 MPa, by using a capillary rheometer, and becomes a standard of the molecular weight of the liquid crystal polyester (see "Liquid Crystal Polymer—Synthesis/Molding/Application—" edited by Naoyuki Koide, CMC Corporation, Jun. 5, 1987, p. 95).

The liquid crystal polyester may be used alone, or may be used in combination with two or more thereof.

In the resin composition of the embodiment, the amount of the liquid crystal polyester is preferably 40 parts by mass or more and 90 parts by mass or less, is more preferably 45 parts by mass or more and 85 parts by mass or less, and is further preferably 50 parts by mass or more and 80 parts by mass or less, with respect to 100 parts by mass of the total amount of the liquid crystal polyester and the filling material.

In another aspect of the present invention, the amount of the liquid crystal polyester is preferably 35 parts by mass or more and 70 parts by mass or less, is more preferably 50 parts by mass or more and 70 parts by mass or less, and is further preferably 50 parts by mass or more and 65 parts by mass or less, further most preferably 50 parts by mass or more and 55 parts by mass or less with respect to 100 parts by mass of the total amount of the liquid crystal polyester and the filling material.

(Filling Material)

The filling material contained in the resin composition of the embodiment will be described.

In the embodiment, since the resin composition contains a specific filling material described later, it is possible to impart sufficient strength and sufficient hardness to the actuator after the molding.

The filling material included in the resin composition of the embodiment may be an inorganic filling material or an organic filling material. Moreover, the filling material may be a fiber-shaped inorganic filling material or a board-shaped filling material. Examples of the fiber-shaped inorganic filling material include a glass fiber; a carbon fiber such as a PAN-based carbon fiber and a pitch-based carbon fiber; a ceramic fiber such as a silica fiber, an alumina fiber, and a silica alumina fiber; and a metal fiber such as a stainless steel fiber. Whiskers such as a potassium titanate whisker, a barium titanate whisker, a wollastonite whisker, an aluminum borate whisker, a silicon nitride whisker, and a silicon carbide whisker may be exemplified.

In the resin composition of the embodiment, the amount of the filling material is preferably 30 parts by mass or more and 50 parts by mass or less, and is more preferably 30 parts by mass or more and 48 parts by mass or less, with respect to 100 parts by mass of the total amount of the liquid crystal polyester and the filling material. In a case where the filling material is coated with a thermoplastic resin or a thermosetting resin, is treated with the sizing agent, or is coated with or be focused by the coupling agent or the other surface treatment agents, the mass of the thermoplastic resin, the sizing agent, the coupling agent, or the other surface treatment agents is not included in the mass of the filling material, in calculating the amount of the filling material. Since the amount of the filling material is in the above range, the mechanical strength, specifically, the surface strength of the molded body is likely to be improved, and it is possible to make filling ability of the filling material into the thin wall portion, the thick wall portion, and the lattice portion of the narrow pitch favorable.

In another aspect of the present invention, the amount of the filling material in the resin composition is preferably 30 parts by mass or more and 55 parts by mass or less, is more preferably 30 parts by mass or more and 50 parts by mass or less, and is further preferably 35 parts by mass or more and 50 parts by mass or less, further most preferably 45 parts by mass or more and 50 parts by mass or less with respect to 100 parts by mass of the total amount of the liquid crystal polyester and the filling material In the embodiment, the total amount of the liquid crystal polyester and the filling material in the resin composition is generally 70 to 100 wt %, is preferably 80 to 99.8 wt %, and is more preferably 85 to 99.8 wt %, is further preferably 94 to 99.8wt % with respect to the total mass of the resin composition.

It is preferable that the filling material used in the resin composition of the embodiment is the glass filling material among the above materials.

Glass Filling Material

In the embodiment, since the resin composition contains the glass filling material, it is possible to improve heat resistance and processability of a molded body, and it is possible to impart sufficient strength and sufficient hardness to the actuator after the molding.

If necessary, the glass filling material may be treated with a coupling agent such as a silane-based coupling agent or a titanium-based coupling agent.

The shape of the glass filling material is not particularly limited. For example, the shape thereof may be any of a fiber shape, a board shape, and a grain shape such as a sphere shape, and it is preferable that the fiber-shaped glass fiber is used from a viewpoint of availability and mechanical strength particularly among the filling materials.

In the specification herein, "glass fiber" is referred to as "glass of which a fiber diameter is 1 to 50 μm, and an aspect ratio is 2 to 1000". The fiber diameter can be measured by a method described later. In the specification herein, "aspect ratio" is referred to as a ratio of fiber length (long axis length)/fiber diameter (short axis length).

As an example of the glass fiber, a chopped glass fiber of a long fiber type obtained by cutting a strand spun from a glass melting step to a certain length immediately after spinning, a milled glass fiber of a short fiber type obtained by grinding the glass fiber or cutting the fiber very short, and other glass fibers manufactured by various methods may be used, and can be also used in combination with two or more types thereof.

As a glass fiber, a weakly basic glass fiber is excellent in a viewpoint of mechanical strength, and can be preferably used. The glass fiber of which the content percentage of silicon oxide to the total mass of the glass fiber is 50 to 80 wt % is preferably used, and the glass fiber of which the content percentage of silicon oxide is 65 to 77 wt % is more preferably used.

For example, the glass fiber may be coated with a thermoplastic resin such as a urethane-based resin, an acrylic-based resin, and an ethylene/vinyl acetate copolymer, or a thermosetting resin such as an epoxy resin, or may be treated with a sizing agent. Moreover, the glass fiber may be coated with or may be bundled by a coupling agent such as a silane-based coupling agent and a titanate-based coupling agent, or other surface treatment agents. It is preferable that the glass fiber is coated with or bundled by a thermosetting resin such as an epoxy resin.

It is preferable that the fiber diameter (single fiber diameter) of the glass fiber being the raw material is 5 μm or more and 20 μm or less. In a case where the fiber diameter of the glass fiber is 5 μm or more, it is possible to enhance a stiffening effect on the molded body in comparison with a case where the fiber diameter is less than 5 μm. The fiber diameter of the glass fiber is more preferably 6 μm or more. When the fiber diameter of the glass fiber is in the above range, the flowability of the resin composition is improved, and the effect of the glass fiber as a reinforcing material of the molded body is likely to be improved, which are preferable. The fiber diameter of the glass fiber is preferably 17 μm or less, and is more preferably 15 μm or less.

That is, the fiber diameter (single fiber diameter) of the glass fiber being the raw material is preferably 6 μm or more and 17 μm or less, and more preferably 8 μm or more and 13 μm or less.

In the specification herein, "fiber diameter of the glass fiber" means a value which is measured by "method A" among methods described in JIS R3420: 2013 "7.6 single fiber diameter", unless otherwise noted.

The glass filling material may be used alone, or may be used in combination with two or more thereof.

In the resin composition of the embodiment, the amount of the glass fiber is preferably 30 parts by mass or more and 50 parts by mass or less, and is more preferably 30 parts by mass or more and 48 parts by mass or less, with respect to 100 parts by mass of the total amount of the liquid crystal polyester and the glass fiber. In a case where the glass fiber is coated with the thermoplastic resin or the thermosetting resin, is treated with the sizing agent, or is coated with or be focused by the coupling agent or the other surface treatment agents, the mass of the thermoplastic resin, the sizing agent, the coupling agent, or the other surface treatment agents is not included in the mass of the glass fiber, in calculating the amount of the glass fiber. Since the amount of the glass fiber is in the above range, the mechanical strength, specifically, the surface strength of the molded body is likely to be improved, and it is possible to make filling ability of the glass fiber into the thin wall portion, the thick wall portion, and the lattice portion of the narrow pitch favorable. The above amount of the glass fiber is similar with respect to the amount of the glass filling material.

In another aspect of the present invention, the amount of the glass fiber in the resin composition is preferably 30 parts by mass or more and 55 parts by mass or less, is more preferably 30 parts by mass or more and 50 parts by mass or less, and is further preferably 35 parts by mass or more and 50 parts by mass or less, further most preferably 45 parts by mass or more and 50 parts by mass or less with respect to 100 parts by mass of the total amount of the liquid crystal polyester and the glass fiber.

In the embodiment, the total amount of the liquid crystal polyester and the glass fiber in the resin composition is generally 70 to 100 wt %, is preferably 80 to 99.8 wt %, and is more preferably 85 to 99.8 wt %, is further preferably 94 to 99.8 wt % with respect to the total mass of the resin composition.

In the resin composition of the embodiment, a weight average fiber length of the glass fiber is preferably 75 to 350

μm, and is more preferably 100 to 330 μm. By setting the weight average fiber length of the glass fiber to be in the above range, it is possible to improve the filling ability of the glass fiber in the actuator after the molding, it is possible to realize a state where any of the thin wall portion, the thick wall portion, and the narrow pitch between the through holes is filled with the glass fibers, and it is possible to impart sufficient strength and sufficient hardness to the actuator after the molding.

Here, it is possible to measure the weight average fiber length of the glass fiber in the composition by the following method. A resin is removed by heating 5 g of pellets which is formed of a composition containing a glass fiber at a temperature of 600° C. for 8 hours in a muffle furnace under an air atmosphere, and the fiber lengths of the remaining glass fibers of 500 or more which are randomly selected are measured at magnification of 100 times, by using a video microscopeVHX1000 (manufactured by Keyence Corporation). In the specification herein, for example, the number of measured glass fibers can be 1000. Here, it is possible to calculate a weight average fiber length (Lw) by Expression (A). In the specification herein, "fiber length of the glass fiber" means the longest length among the lengths of the respective portions on respective two-dimensional cross sections of the remaining glass fibers after the heating, which can be observed from a video microscope.

$$Lw=\Sigma(Ni\times Li^2)/\Sigma(Ni\times Li) \qquad (A)$$

In Expression (A), Li is a class (range) of the fiber length of the glass fiber, and 10 μm is set to the class (range).

In Expression (A), Ni is calculated by (the number of glass fibers of which the fiber lengths are included in Li)/(the total numbers of the measured glass fibers).

(Other Components)

The resin composition of the embodiment may contain other components, which do not correspond to either of the liquid crystal polyester and the filling material, within the range without damaging the effects of the embodiment.

As an example of the other components, a filling material (which may be referred to as "other filling materials" hereinafter) in addition to the above filling materials, an additive, a resin (which may be referred to as "other resins", hereinafter) in addition to the liquid crystal polyester, and the like may be used.

The other components may be used alone, or may be used in combination with two or more thereof.

The other filling materials may be a fiber-shaped filling material, a board-shaped filling material, or other grain-shaped filling materials such as a sphere shape other than a fiber shape and a board shape.

The other filling materials may be an inorganic filling material or an organic filling material.

Examples of the fiber-shaped organic filling material include a polyester fiber or an aramid.

Examples of the board-shaped filling material include talc, mica, graphite, wollastonite, barium sulfate, calcium carbonate. Mica may be muscovite, phlogopite, fluorine phlogopite, or tetrasilicon mica.

Examples of the grain-shaped filling material include silica, alumina, titanium oxide, boron nitride, silicon carbide, calcium carbonate.

In a case where the resin composition of the embodiment contains the other filling materials, it is preferable that the amount of the other filling materials of the resin composition is more than 0.1 parts by mass, and is 100 parts by mass or less, with respect to 100 parts by mass of the total amount of the liquid crystal polyester.

It is possible to improve molding processability by further adding a parting agent to the resin composition of the embodiment. As a parting agent, for example, montanic acid and a salt thereof, an ester thereof, a half ester thereof, stearyl alcohol, stearamide, and polyethylene wax may be used, and it is preferable that a fatty acid ester of pentaerythritol is used.

The blending amount of the parting agent is generally 0.1 to 0.5 parts by mass, and is preferably 0.2 to 0.4 parts by mass, with respect to 100 parts by mass of the liquid crystal polyester and the glass fiber. When the blending amount of the parting agent is in the above range, contamination of a tool or the blister of the molded body is less likely to be caused, and a release effect is obtained.

It is possible to impart predetermined properties to the resin composition of the embodiment by adding an antioxidant and a heat stabilizer (for example, hindered phenol, hydroquinone, phosphites, a substitution product thereof, or the like), an ultraviolet absorbing agent (for example, resorcinol, salicylate, benzotriazole, benzophenone or the like), a general additive such as a plasticizer, a flame retardant, a flame retardant promoter, an antistatic agent, a surfactant, and a coloring agent, or other thermoplastic resins (fluorocarbon resin and the like), in the range without damaging the object of the present invention.

In the resin composition of the embodiment, it is possible to improve the molding processability by further adding a higher fatty acid metal salt. The higher fatty acid referred herein means fatty acid having 12 or more carbon atoms, and is preferably fatty acid having 12 to 22 carbon atoms. As a specific example thereof, lauric acid, myristic acid, palmitic acid, stearic acid, oleic acid, behenic acid, or the like may be used. As a higher fatty acid metal salt used in the present invention, a higher fatty acid metal salt having a melting point of 150° C. or higher is preferably used, and a higher fatty acid metal salt having a melting point of 200° C. or higher is more preferably used, from a viewpoint of the molding processability of the obtained liquid crystal resin composition. Specifically, calcium stearate, calcium laurate, calcium behenate, barium stearate, barium laurate, barium behenate, aluminum stearate, lithium stearate, lithium behenate, potassium stearate, and sodium stearate are used. Preferably, barium stearate, barium laurate, barium behenate, lithium stearate, lithium behenate, potassium stearate, and sodium stearate are used. More preferably, potassium strearate, and calcium behenate are used. In the present invention, it is possible to measure the melting point of the higher fatty acid by an endothermic peak temperature which is observed when measured under a temperature rise condition of 20° C./minute from room temperature by differential calorimetric measurement. The amount of the higher fatty acid metal salt is generally 1.0 part by mass or less, is preferably 0.5 parts by mass or less, and is more preferably 0.1 parts by mass or less, with respect to 100 parts by mass of the total amount of the liquid crystal polyester and the filling material. In another aspect of the present invention, the amount of the higher fatty acid metal salt is generally 0 to 1.0 part by mass, is preferably 0 to 0.5 parts by mass, and is more preferably 0 to 0.1 parts by mass, with respect to 100 parts by mass of the total amount of the liquid crystal polyester and the filling material.

In the embodiment, in a case where the resin composition contains the above additives, it is preferable that the amount of the additive of the resin composition is more than 0.01 parts by mass, and is 5 parts by mass or less, with respect to 100 parts by mass of the total amount of the liquid crystal polyester and the filling material.

Examples of the other resins include thermoplastic resins other than aromatic polysulfone such as polypropylene, polyamide, polyester, polyphenylene sulfide, polyether sulfone, polyether ketone, polycarbonate, polyphenylene ether, and polyetherimide; and thermosetting resins such as a phenol resin, an epoxy resin, a polyimide resin, and a cyanate resin.

In the embodiment, in a case where the resin composition contains the other resins, it is preferable that the amount of the other resins in the resin composition is more than 1 part by mass, and is 20 parts by mass or less, with respect to 100 parts by mass of the total amount of the liquid crystal polyester.

In the embodiment, it is possible to produce the resin composition by mixing the liquid crystal polyester, the glass filling material, and other components used if necessary collectively or in a suitable sequence.

It is preferable that the resin composition of the embodiment is pelletized by melting and kneading the liquid crystal polyester, the glass filling material, and other components which may be used if necessary, with an use of an extruding machine.

It is preferable that the extruding machine includes a cylinder, one or more screws disposed in the cylinder, and one or more supply ports disposed in the cylinder. Furthermore, it is more preferable that one or more vent portions are disposed in the cylinder.

As a method for setting the weight average fiber length of the glass fiber included in the resin composition to be within the range described above, for example, a method for supplying the glass fibers to the extruding machine by blending the glass fibers of which the lengths are different from each other in advance, or a method for supplying one glass fiber together with the liquid crystal polyester from the supply port on a drive side of the extruding machine, and supplying the other glass fiber from an intermediate supply port may be used.

As glass fibers of which the lengths are different from each other, for example, a combination of a milled glass fiber and a chopped glass fiber is considered. Specifically, a combination of a milled glass fiber having an average fiber length of 30 to 150 μm and a chopped glass fiber having an average fiber length of 3 to 4 mm may be used. As a method for setting the weight average fiber length of the combination of the glass fibers to be with in the above range, a method for supplying pellets to the extruding machine by blending pellets of a liquid crystal polyester resin composition containing the milled glass fibers and pellets of a liquid crystal polyester resin composition containing the chopped glass fibers in advance, or a method for supplying one pellet together with a liquid crystal polyester resin from the supply port on the drive side of the extruding machine, and supplying the other pellet from the intermediate supply port may be used.

After feeding the glass fibers to the extruder, for example, the weight average fiber length of the glass fiber can be within the above range by a method for adjusting the degree of breakage of the glass fiber by a screw configuration, a method for adjusting a degree of breakage of the glass fiber by adjusting shearing force which is applied to the glass fiber. A method for adjusting the melting viscosity of a molten resin by controlling the number of screw rotations and a cylinder temperature, as means of adjusting the shearing force, may be used.

Molding Method

As a molding method of the resin composition, a melt molding method is preferable. As an example of the melt molding method, an injection molding method; an extrusion molding method such as a T-die method and an inflation method; a compression molding method; a blow molding method; a vacuum molding method; and a press molding method may be used. Among the methods, the molding method of the resin composition is preferably the injection molding method.

Injection molding can be carried out by injection molding the resin composition into a tool with an injection molding machine.

In another aspect of the present invention, the set temperature of a cylinder at the time of the injection molding is preferably 250° C. to 450° C., and is more preferably 300° C. to 400° C.

In an aspect of the present invention, there is provided a method for producing a molded body including a step of melt-kneading the liquid crystal polyester resin composition of the present invention at a temperature ranging from a temperature higher by 15° C. than a flow starting temperature of the liquid crystal polyester to a temperature higher by 65° C. than the flow starting temperature, an injection molding step for injecting and molding the molten liquid crystal polyester resin composition into a tool set at a temperature of 60° C. or higher and 160° C. or lower, wherein the resin composition contains glass fibers having a weight average fiber length of 75 μm to 350 μm, and a weight average fiber length of the glass fibers in the molded body is 75 μm to 350 μm.

In order to set the weight average fiber length of the glass fibers in the actuator within a specific range after molding, as a favorable injection molding method, a method in which pellets of the liquid crystal polyester resin composition is melted at a molding temperature ranging from a temperature higher by 15° C. than the flow starting temperature of the liquid crystal polyester to a temperature higher by 65° C. than the flow starting temperature (the flow staring temperature+15° C. to the flow starting temperature+65° C.), and the molten liquid crystal polyester resin composition is molded and injected into a tool set at a temperature of 60° C. or higher and 160° C. or lower can be used. As an example, above-mentioned specific range of the weight average fiber length of the glass fiber is 75 μm to 350 μm.

It is preferable that the liquid crystal polyester resin composition is melted and molded in the above temperature range to the flow starting temperature of the liquid crystal polyester since the weight average fiber length of the glass fiber melt-kneaded together with pellets of the liquid crystal polyester resin composition is not changed during injection molding. It is more preferable that the melting and molding temperature is within a range from a temperature higher by 15° C. than the flow starting temperature of the liquid crystal polyester to a temperature higher by 65° C. than the flow starting temperature.

The temperature of the tool is preferably 60° C. or higher and 160° C. or lower. The higher the temperature of the tool, the more improvable of the strength of the actuator, it is advantageous. When the temperature of the tool is too high, the problem which the cooling effect decreases and the time required for the cooling step becomes long, which decreases the productivity, and the deformation of the molded body is occurred since the mold releasability from the tool tends to be lowered, is occurred, it is not preferable. The temperature of the tool is more preferably 80° C. or more and 140° C. or less.

EXAMPLES

Hereinafter, the present invention will be more specifically described by examples, but the present invention is not limited to the following examples.

Producing Example 1

Method for Producing Liquid Crystal Polyester A1
6-hydroxy-2-naphthoic acid (1034.99 g, 5.5 mol), 2,6-naphthalene dicarboxylic acid (378.33 g, 1.75 mol), terephthalic acid (83.07 g, 0.5 mol), hydroquinone (272.52 g, 2.475 mol, excess of 0.225 mol with respect to a total number of moles of 2,6-naphthalene dicarboxylic acid and terephthalic acid), acetic anhydride (1226.87 g, 12 mol), and 1-methylimidazole (0.17 g) as a catalyst were put into a reactor including a stirring device, a torque meter, a nitrogen gas introduction tube, a thermometer and a reflux condenser, the gas in the reactor was substituted with nitrogen gas, then a temperature was increased from room temperature to 145° C. over 15 minutes while stirring the materials under a nitrogen atmosphere, and the reflux was carried out at 145° C. for 1 hour. Next, the temperature was increased from 145° C. to 310° C. over 3.5 hours while distilling off by-product acetic acid and unreacted acetic anhydride. After retaining the temperature at 310° C. for 3 hours, the contents thereof were extracted and were cooled up to the room temperature. After the obtained solid material was ground to a grain size of approximately 0.1 to 1 mm with a grinder, under a nitrogen atmosphere, the temperature was increased from the room temperature to 250° C. over 1 hour, and was increased from 250° C. to 310° C. over 10 hours, and solid phase polymerization was performed by retaining the ground solid material at 310° C. for 5 hours. After the solid phase polymerization, a powdered liquid crystal polyester A1 was obtained by being cooled. The flow starting temperature of the liquid crystal polyester was 324° C.

In the liquid crystal polyester A1, the amount of the repeating unit including a 2,6-naphthylene group was 70.9 mol %, with respect to the total number of moles of all repeating units.

Producing Example 2

Method for Producing Liquid Crystal Polyester A2
p-hydroxybenzoic acid (27.6 g, 0.2 mol), terephthalic acid (415.3 g, 2.5 mol), 6-hydroxy-2-naphthoic acid (903.3 g, 4.8 mol), 4,4'-dihydroxybiphenyl (446.5 g, 2.4 mol), acetic anhydride (1123.0 g, 11.0 mol), and 0.2 g of 1-methylimidazole were put into a reactor including a stirring device, a torque meter, a nitrogen gas introduction tube, a thermometer and a reflux condenser, the gas in the reactor was substituted with nitrogen gas, then the temperature was increased from room temperature to 150° C. over 30 minutes while stirring the materials under a nitrogen atmosphere, and the reflux was carried out at 150° C. for 1 hour. Next, the temperature was increased up to 200° C. over 30 minutes, and was increased from 200° C. to 315° C. over 30 minutes while distilling off by-product acetic acid and unreacted acetic anhydride. After retaining the temperature until an increase of the torque was recognized at 315° C., the contents thereof were extracted from the reactor, and were cooled up to the room temperature. The obtained solid material was ground with a grinder, and a powdered prepolymer was obtained. Next, under a nitrogen gas atmosphere, the temperature was increased from the room temperature to 250° C. over 1 hour, and was increased from 250° C. to 320° C. over 7 hours 30 minutes, and solid phase polymerization was performed by retaining the powdered prepolymer at 320° C. for 5 hours. After the solid phase polymerization, a powdered liquid crystal polyester A2 was obtained by being cooled. The flow starting temperature of the liquid crystal polyester was 353° C.

In the liquid crystal polyester A2, the amount of the repeating unit including a 2,6-naphthylene group was 48.5 mol %, with respect to the total number of moles of all repeating units.

Producing Example 3

Method for Producing Liquid Crystal Polyester A3
p-hydroxybenzoic acid (994.5 g, 7.2 mol), terephthalic acid (299.1 g, 1.8 mol), isophthalic acid (99.7 g, 0.6 mol), 4,4'-dihydroxybiphenyl (446.9 g, 2.4 mol), acetic anhydride (1347.6 g, 13.2 mol), and 0.2 g of 1-methylimidazole were put into a reactor including a stirring device, a torque meter, a nitrogen gas introduction tube, a thermometer and a reflux condenser, the gas in the reactor was substituted with nitrogen gas, then the temperature was increased from room temperature to 150° C. over 30 minutes while stirring the materials under a nitrogen atmosphere, and the reflux was carried out at 150° C. for 1 hour. Next, 0.9 g of 1-methylimidazole was added, and the temperature was increased up to 320° C. over 2 hours 50 minutes while distilling off by-product acetic acid and unreacted acetic anhydride. After retaining the temperature until an increase of the torque was recognized at 320° C., the contents thereof were extracted from the reactor, and were cooled up to the room temperature. The obtained solid material was ground with a grinder, and a powdered prepolymer was obtained. Next, under a nitrogen gas atmosphere, the temperature was increased from the room temperature to 250° C. over 1 hour, and was increased from 250° C. to 285° C. over 5 hours, and solid phase polymerization was performed by retaining the powdered prepolymer at 285° C. for 3 hours. After the solid phase polymerization, a powdered liquid crystal polyester A3 was obtained by being cooled. The flow starting temperature of the liquid crystal polyester was 327° C.

In the liquid crystal polyester A3, the amount of the repeating unit including a 2,6-naphthylene group was 0 mol %, with respect to the total number of moles of all repeating units.

Producing Example 4

Liquid Crystal Polyester A4
p-hydroxybenzoic acid (994.5 g, 7.2 mol), terephthalic acid (352.9 g, 2.12 mol), 6-hydroxy-2-naphthoic acid (112.9 g, 0.6 mol), 4,4'-dihydroxybiphenyl (274.8 g, 1.48 mol), p-aminophenol (90.7 g, 0.83 mol), acetic anhydride (1193.7 g, 11.7 mol), and 0.2 g of 1-methylimidazole were put into a reactor including a stirring device, a torque meter, a nitrogen gas introduction tube, a thermometer and a reflux condenser, the gas in the reactor was substituted with nitrogen gas, then the temperature was increased from room temperature to 150° C. over 30 minutes while stirring the materials under a nitrogen atmosphere, and the reflux was carried out at 150° C. for 1 hour. Next, the temperature was increased up to 320° C. over 4 hours while distilling off by-product acetic acid and unreacted acetic anhydride. After retaining the temperature until an increase of the torque was recognized at 320° C., the contents thereof were extracted from the reactor, and were cooled to room temperature. The obtained solid material was ground with a grinder, and a powdered prepolymer was obtained. Next, under a nitrogen gas atmosphere, the temperature was increased from the room temperature to 240° C. over 1 hour, and was increased from 240° C. to 300° C. over 5 hours, and solid phase polymerization was performed by retaining the powdered prepolymer at 300° C. for 5 hours. After the solid phase polymerization, a powdered liquid crystal polyester A4 was obtained by being cooled. The flow starting temperature of the liquid crystal polyester was 315° C.

In the liquid crystal polyester A4, the amount of the repeating unit including a 2,6-naphthylene group was 4.9 mol %, with respect to the total number of moles of all repeating units.

Producing Example 5

Liquid Crystal Polyester A5 p-hydroxybenzoic acid (1176.8 g, 8.52 mol), 6-hydroxy-2-naphthoic acid (654.9 g, 3.48 mol), and acetic anhydride (1347.6 g, 13.2 mol) were put into a reactor including a stirring device, a torque meter, a nitrogen gas introduction tube, a thermometer and a reflux condenser, the gas in the reactor was substituted with nitrogen gas, then the temperature was increased from room temperature to 150° C. over 30 minutes while stirring the materials under a nitrogen atmosphere, and the reflux was carried out at 150° C. for 3 hours. Next, the temperature was increased up to 290° C. over 3 hours 50 minutes while distilling off by-product acetic acid and unreacted acetic anhydride. After retaining the temperature at 290° C. for 60 minutes, the contents thereof were extracted from the reactor, and were cooled up to the room temperature. The obtained solid material was ground with a grinder, and a powdered prepolymer was obtained. Next, under a nitrogen gas atmosphere, the temperature was increased from the room temperature to 160° C. over 1 hour, and was increased from 160° C. to 200° C. over 30 minutes. Furthermore, the temperature was increased from 200° C. to 260° C. over 7 hours, and solid phase polymerization was performed by retaining the powdered prepolymer at 260° C. for 5 hours. Thereafter, a powdered liquid crystal polyester A5 was obtained by being cooled. The flow starting temperature of the liquid crystal polyester was 273° C.

In the liquid crystal polyester A5, the amount of the repeating unit including a 2,6-naphthylene group was 29.0 mol %, with respect to the total number of moles of all repeating units.

<Filling Material and Parting Agent>

In the examples, the following filling materials and parting agent were used.

B1: chopped glass fiber CS3J260S (average fiber length of 3 mm, fiber diameter of 10.5 μm) (manufactured by Nitto Boseki Co., Ltd.)

B2: milled glass fiber EFH 150-01 (average fiber length of 150 μm, fiber diameter of 10 μm) (manufactured by Central Glass Co., Ltd.)

C1: Talc X-50 (manufactured by Nippon Talc Co., Ltd.)

D1: parting agent Loxiol VPG 861 (manufactured by Emery Oleochemicals Japan Ltd.)

Example 1 to 7, Comparative Examples 1 to 9

After a resin component, a glass fiber, a filling material, and a parting agent of types shown in Tables 1 and 2 were respectively mixed, a mixture thereof was melt-kneaded with a screw in which a kneading block was inserted between a side feeder and a tool plate at a cylinder temperature of 340° C. and the number of rotations of 150 rpm while deaeration is performed by vacuum vent, by using a twin-screw extruding machine with a side feeder ("PCM-30HS" manufactured by Ikegai Iron Works Co., Ltd.) and a water seal vacuum pump ("SW-25" manufactured by Shinko Seiki Co., Ltd.). The ejected strand was cut, and a liquid crystal polyester resin composition was obtained in a pellet shape.

In the following Tables 1 and 2, each sign means as follows. Moreover, numerical values in [ ] are a blending ratio (parts by mass).

A1 to A5: the above liquid crystal polyesters A1 to A5

B1: the above glass fiber B1

B2: the above glass fiber B2

C1: the above talc C1

D1: the above parting agent D1

In Comparative Examples 1 to 4, molded bodies were obtained under conditions described below, by using the following commercially available resin compositions.

<Resin Composition>

Comparative Example 1; PA1: Stanyl 46HF4550 (manufactured by DSM), filled with 50% glass fibers Comparative Example 2; PA2: Stanyl 46HF5040 (manufactured by DSM), filled with 40% glass fibers Comparative Example 3; PPS1: FZ-1140-D5 (manufactured by DIC Corporation), filled with 40% glass fibers Comparative Example 4; PPS2: FZ-4020-A1 (manufactured by DIC Corporation), filled with 40% glass fibers <Measuring Conditions>

The respective measuring conditions in the examples are as follows.

[Flame Retardance Test]

A flame retardance test was carried out in conformity to UL94 standard, and classification of flame retardance was performed.

The UL94 standard is a standard which is defined and is evaluated by Underwriters Laboratories LLC of the USA. A test method in which the combustion time and presence or absence of a dropped material were checked by applying a flame to a test piece of 12.7 mm×127 mm×0.75 mmt defined by UL94, was used.

In another aspect of the present invention, it is preferable that the evaluation is V-0, in the above UL 94 standard.

[Halogen-Free Analysis]

A halogen-free analysis was performed by a sample combustion-ion chromatograph method in conformity to BS EN 14582: 2007.

A sample was combusted by introducing oxygen or argon into a heated quartz combustion tube, and the generated combustion gas was absorbed in an absorbing solution, and the absorbing solution was separated and quantitated by the ion chromatograph method, and the amount (halogen value) of chlorine (Cl) and bromine (Br) in the sample was obtained. The detection lower limit value of Cl was 50 ppm, and it was assumed to be "<50 ppm" in a case where the amount of Cl was less than the detection limit. The detection lower limit value of Br was 10 ppm, and it was assumed to be "<10 ppm" in a case where the amount of Br was less than the detection limit In another aspect of the present invention, it is preferable that Cl and Br are less than the detection lower limit, in the halogen-free analysis in conformity to the above BS EN 14582: 2007.

[Heat Resistance Test]

In a test piece of 12.7 mm×6.4 mm×6.4 mmt, heat resistance (deflection temperature under load) was measured at 1.82 MPa in conformity to ASTM D648.

In another aspect of the present invention, the deflection temperature under load is preferably 270 to 350° C., is more preferably 280 to 350° C., and is further preferably 300 to 350° C., in the heating resistance test.

[Solder Resistance Foaming Test]

Ten test pieces of JIS K71131 (½) dumbbell×1.2 mmt were molded, and were put into a heat circulation type oven DN63H (manufactured by Yamato Scientific Co., Ltd.) at 280° C. for 3 minutes, and it was visually checked whether or not foaming occurred on the test pieces. In the ten test pieces, a case where foaming did not occur on any one of the test pieces was evaluated as "A", a case where the foaming occurred on the test piece was evaluated as "B", and a case where the resin was decomposed at 280° C. was evaluated as "decomposition".

In another aspect of the present invention, it is preferable that the evaluation is "A", in the solder resistance foaming test.

[Flowability Measurement]

A thin wall flowability test was performed per each thickness, by using a tool that can change the thickness of a product.

Figure 3:
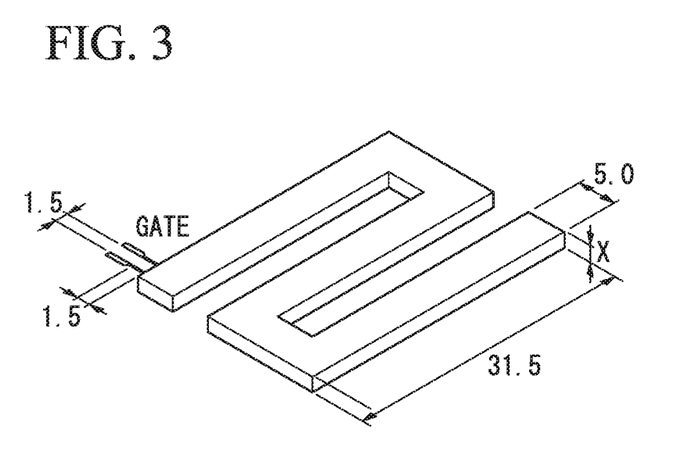
FIG. 3 is an outline diagram showing a thin wall flow measurement tool used in an example.

The shape and dimensions of the used tool are shown in FIG. 3. Molding was performed by changing the thickness indicated by X of FIG. 3 into 0.12 mm, 0.20 mm, and 0.30 mm, respectively.

As an injection molding machine, "ROBOSHOT S2000i30B manufactured by Fanuc Corporation" was used, and injection molding was performed by a molding temperature shown in the following Tables 1 and 2, and molding conditions shown below. The length of the extracted molded body taken out was measured, and thin wall flowability was obtained.

The units of the dimension shown in FIG. 3 is mm.

Molding Conditions

Cylinder setting temperature: the cylinder setting temperature was set as follows so as to be the molding temperature of Tables 1 and 2.

Nozzle (molding temperature)/cylinder front portion (molding temperature)/cylinder middle portion (molding temperature−20° C.)/cylinder rear portion (molding temperature−40° C.)/drop port (molding temperature−70° C.)

For example, in a case of the molding temperature of 350° C., the temperature was set as follows.

350° C./350° C./330° C./310° C./280° C.

Tool temperature: 120° C.

Measured value: 20 mm

Injection speed: 200 mm/s

VP switching: pressure switching at 100 MPa

Holding pressure: 20 MPa

[Thin Wall Bending Strength Measurement]

A test piece of 0.3 mm made by the above flowability measurement was cut into 5 mm×35 mm, and a thin wall bending strength measurement was performed by 3-point bending at which a test speed was 10 mm/s, the distance between supporting points was 5 mm, and the width of an indenter was 1 mm, by using a precise load measuring device "MODEL-1605IIVL" manufactured by Aikoh Engineering Co., Ltd.

In another aspect of the present invention, the thin wall bending strength is preferably 300 to 400 MPa, is more preferably 320 to 400 MPa, and is further preferably 340 to 400 MPa, in the thin wall bending strength measurement.

[Surface Hardness Measurement]

In a test piece of 12.7 mm×6.4 mm×6.4 mmt, the surface hardness was measured at R scale and M scale, in conformity to Rockwell hardness meter FR-1E (manufactured by Toyo Seiki Co., Ltd.) ASTM D785.

In another aspect of the present invention, it is preferable that the surface hardness at R scale is 110 to 150, in the surface hardness measurement.

In further another aspect of the present invention, the surface hardness at M scale is preferably 80 to 120, and is more preferably 90 to 120, in the surface hardness measurement.

[Measurement of Weight Average Fiber Length of Glass Fiber]

As a method for measuring the weight average fiber length of the glass fiber, a resin was removed by heating 5 g of pellets which was formed of a composition containing a glass fiber at a temperature of 600° C. for 8 hours in air of a muffle furnace (manufactured by Yamato Scientific Co. Ltd.), and fiber lengths of the remaining glass fibers of 1000 which were randomly selected were measured at magnification of 100 times, by using a video microscope VHX1000 (manufactured by Keyence Corporation), and the weight average fiber length was calculated.

TABLE 1

| | | Glass Fiber | | | |
|---|---|---|---|---|---|
| | Resin component | Type | Weight Average Fiber Length (μm) | Filling Material | Parting Agent | Molding Temperature (° C.) |
| Example 1 | A1 [70] | B1 [30] | 340 | — | D1 [0.3] | 350 |
| Example 2 | A1 [60] | B1 [40] | 320 | — | D1 [0.3] | 350 |
| Example 3 | A1 [60] | B1 [40] | 190 | — | D1 [0.3] | 350 |
| Example 4 | A1 [55] | B1 [45] | 190 | — | D1 [0.3] | 350 |
| Example 5 | A2 [65] | B1 [35] | 200 | — | D1 [0.3] | 370 |
| Example 6 | A1 [55] | B2 [45] | 120 | — | D1 [0.3] | 350 |
| Example 7 | A1 [50] | B1 [45] | 210 | C1 [5] | D1 [0.3] | 350 |

TABLE 2

| | | Glass Fiber | | | |
|---|---|---|---|---|---|
| | Resin component | Type | Weight Average Fiber Length (μm) | Filling Material | Parting Agent | Molding Temperature (° C.) |
| Comparative Example 1 | PA1 | — | — | — | — | 320 |
| Comparative Example 2 | PA2 | — | — | — | — | 320 |
| Comparative Example 3 | PPS1 | — | — | — | — | 320 |
| Comparative Example 4 | PPS2 | — | — | — | — | 320 |
| Comparative Example 5 | A3 [55] | B1 [45] | 300 | — | D1 [0.3] | 350 |
| Comparative Example 6 | A4 [65] | B1 [20] | 410 | C1 [15] | D1 [0.3] | 350 |
| Comparative Example 7 | A4 [60] | B1 [40] | 290 | — | D1 [0.3] | 350 |
| Comparative Example 8 | A5 [60] | B1 [40] | 240 | — | D1 [0.3] | 330 |
| Comparative Example 9 | A1 [45] | B1 [55] | 190 | — | D1 [0.3] | 350 |

Regarding resin compositions of Examples 1 to 7 and Comparative Examples 1 to 9, the flame retardance, the halogen value, the heat resistance, the solder resistance foaming, the thin wall flowability, the thin bending strength, and the surface hardness were measured. The results thereof are described in Tables 3 and 4.

In the resin compositions of Examples 1 to 7 and Comparative Examples 1 to 9, the molding shrinkage percentage of a molded body, the bending strength and the tensile strength, and the Izod impact strength were measured by the following method. The results thereof are described in Tables 5 and 6.

[Measurement of Molding Shrinkage Percentage of Molded Body]

In each of the resin compositions of Examples 1 to 7 and Comparative Examples 1 to 9, by using an injection molding machine PNX40-5A (manufactured by Nissei Plastic Industrial Co., Ltd.), regarding a flat board-shaped test piece of 64 mm (MD)×64 mm (TD)×3 mmt which was manufactured by the injection molding at the molding temperature shown in Tables 1 and 2, and the tool temperature of 130° C., the lengths of two sides of MD were measured, and the average value thereof was obtained. The shrinkage percentage of MD was calculated by the following expression, based on the average value and the length of MD of a tool cavity. Moreover, regarding the obtained molded body, the lengths of two sides of TD were measured, the average value thereof was obtained, and the shrinkage percentage of TD was calculated by the following expression, based on the average value and the length of TD of the tool cavity. The results thereof are shown in Tables 5 to 6.

[Shrinkage percentage (%) of MD]=([Length (μm) of MD of tool cavity]−[Average value (μm) of lengths of two sides of MD of molded body])/[Length (μm) of MD of tool cavity]×100

[Shrinkage percentage (%) of TD]=([Length (μm) of TD of tool cavity]−[Average value (μm) of lengths of two sides of TD of molded body])/[Length (μm) of TD of tool cavity]×100

In another aspect of the present invention, the shrinkage percentage of MD is preferably 0.05 to 0.35%, is more preferably 0.05 to 0.30%, is further preferably 0.05 to 0.20%, and is particularly preferably 0.05 to 0.15%, in the measurement of the molding shrinkage percentage of the molded body.

In further another aspect of the present invention, the shrinkage percentage of TD is preferably 0.10 to 0.80%, is more preferably 0.10 to 0.70%, is further preferably 0.10 to 0.60%, and is particularly preferably 0.10 to 0.50%, in the measurement of the molding shrinkage percentage of the molded body.

[Measurement of Tensile Strength and Tensile Elongation Percentage of Molded Body]

In each of the resin compositions of Examples 1 to 7 and Comparative Examples 1 to 9, by using the injection molding machine PNX40-5A (manufactured by Nissei Plastic Industrial Co., Ltd.), a test piece of ASTM No. 4 having a thickness of 2.5 mm which was manufactured by the injection molding at the molding temperature shown in Tables 1 and 2, and the tool temperature of 130° C. was used, and the tensile strength and the tensile elongation percentage were measured in conformity to ASTM D638. The results thereof are shown in Tables 5 and 6.

[Measurement of Bending Strength and Bending Modulus of Molded Body]

In each of the resin compositions of Examples 1 to 7 and Comparative Examples 1 to 9, by using the injection molding machine (PNX-5A manufactured by Nissei Plastic Industrial Co., Ltd.), a test piece of 127 mm×12.7 mm×6.4 mmt was molded at the molding temperature shown in Tables 1 and 2, and the tool temperature of 130° C., and the bending strength and the bending modulus were measured in conformity to ASTM D790. The results thereof are shown in Tables 5 and 6.

[Izod Impact Strength]

In each of the resin compositions of Examples 1 to 7 and Comparative Examples 1 to 9, by using the injection molding machine PNX40-5A (manufactured by Nissei Plastic Industrial Co., Ltd.), a test piece of 127 mm×12.7 mm×6.4 mmt was molded at the tool temperature of 130° C. The test piece was equally divided into two, and the Izod impact strength was measured in conformity to ASTM D256. The results thereof are shown in Tables 5 and 6.

In the molded body which is molded from the resin composition of the present invention, the preferable range of each measurement described above can be used alone, or two or more preferably ranges can be used by optionally combining the ranges thereof with each other.

TABLE 3

| | Flame Retardance | Halogen Value | | Heat Resistance Test (° C.) | Solder Resistance Foaming Test | Thin Wall Flowability | | | Thin Wall Bending Strength (MPa) | Surface Hardness | |
|---|---|---|---|---|---|---|---|---|---|---|---|
| | | Cl | Br | | | 0.12 (mm) | 0.2 (mm) | 0.3 (mm) | | R Scale | M Scale |
| Example 1 | V-0 0.75 mm | <50 ppm | <10 ppm | 275 | A | 3 | 20 | 36 | 327 | 110 | 80 |
| Example 2 | V-0 0.75 mm | <50 ppm | <10 ppm | 281 | A | 2 | 17 | 30 | 320 | 113 | 90 |
| Example 3 | V-0 0.75 mm | <50 ppm | <10 ppm | 278 | A | 4 | 16 | 30 | 329 | 113 | 90 |
| Example 4 | V-0 0.75 mm | <50 ppm | <10 ppm | 270 | A | 3 | 15 | 25 | 340 | 116 | 94 |
| Example 5 | V-0 0.75 mm | <50 ppm | <10 ppm | 326 | A | 6 | 27 | 54 | 310 | 112 | 90 |

TABLE 3-continued

| | Flame Retardance | Halogen Value | | Heat Resistance Test (°C.) | Solder Resistance Foaming Test | Thin Wall Flowability | | | Thin Wall Bending Strength (MPa) | Surface Hardness | |
|---|---|---|---|---|---|---|---|---|---|---|---|
| | | Cl | Br | | | 0.12 (mm) | 0.2 (mm) | 0.3 (mm) | | R Scale | M Scale |
| Example 6 | V-0 0.75 mm | <50 ppm | <10 ppm | 274 | A | 3 | 18 | 34 | 309 | 112 | 89 |
| Example 7 | V-0 0.75 mm | <50 ppm | <10 ppm | 264 | A | 2 | 14 | 26 | 300 | 110 | 85 |

TABLE 4

| | Flame Retardance | Halogen Value | | Heat Resistance Test (C.) | Solder Resistance Foaming Test | Thin Wall Flowability | | | Thin Wall Bending Strength (MPa) | Surface Hardness | |
|---|---|---|---|---|---|---|---|---|---|---|---|
| | | Cl | Br | | | 0.12 (mm) | 0.2 (mm) | 0.3 (mm) | | R Scale | M Scale |
| Comparative Example 1 | HB 0.75 mm | <50 ppm | <10 ppm | 284 | B | 2 | 18 | 34 | 283 | 118 | 89 |
| Comparative Example 2 | V-0 0.75 mm | <50 ppm | 11000 ppm | 286 | B | 2 | 20 | 42 | 260 | 120 | 95 |
| Comparative Example 3 | V-0 0.75 mm | 2000 ppm | <50 ppm | 271 | Decomposition | 0 | 1 | 1 | Not possible to make test piece | 112 | 104 |
| Comparative Example 4 | V-0 0.75 mm | 570 ppm | <50 ppm | 270 | Decomposition | 0 | 0 | 0 | Not possible to make test piece | 113 | 103 |
| Comparative Example 5 | V-0 0.75 mm | <50 ppm | <10 ppm | 269 | A | 10 | 27 | 55 | 183 | 105 | 60 |
| Comparative Example 6 | V-0 0.75 mm | <50 ppm | <10 ppm | 274 | A | 2 | 21 | 39 | 191 | 106 | 62 |
| Comparative Example 7 | V-0 0.75 mm | <50 ppm | <10 ppm | 273 | A | 2 | 19 | 34 | 280 | 111 | 79 |
| Comparative Example 8 | V-0 0.75 mm | <50 ppm | <10 ppm | 242 | Decomposition | 2 | 20 | 35 | 305 | 118 | 95 |
| Comparative Example 9 | V-0 0.75 mm | <50 ppm | <10 ppm | 255 | A | 1 | 9 | 18 | 250 | 111 | 80 |

TABLE 5

| | Specific Gravity | Molding Shrinkage Percentage | | Tensile | | Bending | | Izod Impact |
|---|---|---|---|---|---|---|---|---|
| | | MD (%) | TD (%) | Strength (MPa) | Elongation (%) | Strength (MPa) | Modulus (GPa) | Strength (J/m) |
| Example 1 | 1.61 | 0.16 | 0.68 | 199 | 4.6 | 177 | 9.9 | 183 |
| Example 2 | 1.69 | 0.27 | 0.57 | 152 | 4.1 | 178 | 11.6 | 104 |
| Example 3 | 1.71 | 0.16 | 0.60 | 160 | 5.2 | 178 | 12.2 | 170 |
| Example 4 | 1.76 | 0.10 | 0.45 | 175 | 5.3 | 170 | 12.6 | 121 |
| Example 5 | 1.66 | 0.25 | 0.68 | 147 | 4.4 | 170 | 11.6 | 142 |
| Example 6 | 1.75 | 0.28 | 0.78 | 144 | 4.2 | 188 | 12.5 | 140 |
| Example 7 | 1.79 | 0.31 | 0.69 | 137 | 6.1 | 156 | 13.8 | 129 |

TABLE 6

| | Specific Gravity | Molding Shrinkage Percentage | | Tensile | | Bending | | Izod Impact |
|---|---|---|---|---|---|---|---|---|
| | | MD (%) | TD (%) | Strength (MPa) | Elongation (%) | Strength (MPa) | Modulus (GPa) | Strength (J/m) |
| Comparative Example 1 | 1.60 | 0.64 | 0.89 | 222 | 6.6 | 154 | 10.3 | 343 |
| Comparative Example 2 | 1.50 | 0.37 | 1.00 | 218 | 7.7 | 238 | 9.1 | 278 |

TABLE 6-continued

| | Specific Gravity | Molding Shrinkage Percentage | | Tensile | | Bending | | Izod Impact |
|---|---|---|---|---|---|---|---|---|
| | | MD (%) | TD (%) | Strength (MPa) | Elongation (%) | Strength (MPa) | Modulus (GPa) | Strength (J/m) |
| Comparative Example 3 | 1.67 | 0.41 | 0.56 | 176 | 5.2 | 240 | 13.5 | 363 |
| Comparative Example 4 | 1.60 | 0.40 | 0.55 | 169 | 5.2 | 260 | 13.1 | 570 |
| Comparative Example 5 | 1.65 | 0.26 | 0.60 | 157 | 5.1 | 158 | 11.8 | 251 |
| Comparative Example 6 | 1.67 | 0.20 | 0.63 | 143 | 5.6 | 159 | 11.4 | 408 |
| Comparative Example 7 | 1.70 | 0.18 | 0.73 | 177 | 6.1 | 165 | 11.1 | 314 |
| Comparative Example 8 | 1.70 | 0.17 | 0.54 | 208 | 7.4 | 197 | 10.4 | 229 |
| Comparative Example 9 | 1.84 | 0.29 | 0.40 | 118 | 3.0 | 95 | 11.3 | 83 |

As shown in the above results, the molded body that is molded by using the resin compositions of Examples 1 to 7 to which the present invention is applied, has high flame retardance, can achieve halogen-free, is excellent in flowability, strength, and surface hardness even in a case of thin wall, and is excellent in solder resistance without foaming.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: MAIN BODY OF ACTUATOR
2: MAIN BODY OF HOUSING
3: SURFACE-MOUNTED ELECTRIC CONNECTOR
4: SHEET-SHAPED CABLE
5: INSERTING PORTION
6: CONTACT
7: CONVEX PORTION OF HOUSING
8: THROUGH HOLE
9: ATTACHING PORTION OF ACTUATOR
10: SIDEWALL OF HOUSING
11: NON-THROUGH HOLE
L: ROTATING SHAFT SET IN LONG SIDE DIRECTION
(i): WIDTH (APPROXIMATELY 1 mm)
(ii): WIDTH (0.5 mm)
(iii): WIDTH OF SHORT SIDE DIRECTION OF THROUGH HOLE (APPROXIMATELY 0.3 mm)
(iv): PITCH WIDTH BETWEEN THROUGH HOLES
(v): THICK WALL PORTION (APPROXIMATELY 0.5 mm)
(vi): THIN WALL PORTION
(vii): THIN WALL PORTION BETWEEN THROUGH HOLES
(x): 0.12 mm, 0.2 mm, OR 0.3 mm

What is claimed is:

1. An actuator which is rotatably attached to a housing, and presses and fixes a sheet-shaped cable to the housing, in a surface-mounted electric connector, the actuator comprising:
a plurality of through holes that penetrate in a thickness direction,
wherein the plurality of through holes are arranged in a line along a predetermined arrangement axis,
the actuator is molded from a resin composition,
the resin composition contains a liquid crystal polyester having repeating units represented by General Formula (1) to General Formula (3), and a filling material,
an amount of the repeating unit including a 2,6-naphthylene group in the liquid crystal polyester is 40 mol % or more with respect to a total number of moles of all repeating units configuring the liquid crystal polyester, and
an amount of the filling material is less than 55 parts by mass with respect to 100 parts by mass of a total amount of the liquid crystal polyester and the filling material, $$—O—Ar^1—CO— \quad (1)$$

$$—CO—Ar^2—CO— \quad (2)$$

$$—X—Ar^3—Y— \quad (3)$$

[in General Formula (1) to General Formula (3), $Ar^1$ represents one of the group consisting of a phenylene group, a naphthylene group, and a biphenylylene group; $Ar^2$ and $Ar^3$ each independently represent one of the group consisting of a phenylene group, a naphthylene group, a biphenylylene group, and a group represented by General Formula (4); X and Y each independently represent one of the group consisting of an oxygen atom and an imino group; and one or more hydrogen atoms in $Ar^1$, $Ar^2$ and $Ar^3$ may be each independently substituted with one of the group consisting of a halogen atom, an alkyl group having 1 to 10 carbon atoms, and an aryl group having 6 to 20 carbon atoms]

$$—Ar^4-Z-Ar^5— \quad (4)$$

[in General Formula (4), $Ar^4$ and $Ar^5$ each independently represent one of the group consisting of a phenylene group and a naphthylene group; and Z represents one of the group consisting of an oxygen atom, a sulfur atom, a carbonyl group, a sulfonyl group, and an alkylidene group having 1 to 10 carbon atoms].

2. The actuator according to claim 1,
wherein the filling material is a glass fiber.

3. The actuator according to claim 2,
wherein an amount of the glass fiber is 30 parts by mass or more and 50 parts by mass or less with respect to 100 parts by mass of the total amount of the liquid crystal polyester and the glass fiber.

4. The actuator according to claim 2,
wherein a weight average fiber length of the glass fiber is 75 μm or more and 350 μm or less.

5. The actuator according to claim 1,
wherein the liquid crystal polyester has 30 mol % or more and 80 mol % or less of the repeating unit represented by General Formula (1), 10 mol % or more and 35 mol % or less of the repeating unit represented by General Formula (2), and 10 mol % or more and 35 mol % or less of the repeating unit represented by General Formula (3), with respect to the total number of moles of all repeating units configuring the liquid crystal polyester.

\* \* \* \* \*